UNITED STATES PATENT OFFICE.

ROBERT ANDREWS, OF MILWAUKEE, WIS., ASSIGNOR TO SAMUEL B. PIERCE, SAMUEL S. JOHNSON, ROBERT ANDEWS, AND ROBERT N. AUSTIN, OF SAME PLACE.

IMPROVED PROCESS OF TREATING TAR FOR THE MANUFACTURE OF STUFFING FOR LEATHER.

Specification forming part of Letters Patent No. 90,333, dated May 25, 1869; Reissue No. 3,707, dated November 2, 1869.

*To all whom it may concern:*

Be it known that I, ROBERT ANDREWS, of the city and county of Milwaukee, in the State of Wisconsin, have invented a new and useful process of so treating tar, known in commerce as "wood-tar," "pitch," "North Carolina or Southern tar," and "Stockholm tar," as to render it absorbable by skin and other porous materials, by so commingling it with tallow, oil, fat, or grease, or greasy or fatty matter that the composition is one substance and of great practical value; and I do hereby declare that the following is a full and exact description of said process.

In describing my process, I shall for brevity speak of using with tar only tallow; but oil, fat, grease, and fatty or greasy matter may, one or all, be by this process combined with tar.

The strengthening and preserving properties of tar have long been known; but by reason of its sticky and other objectionable qualities its use has been confined to cordage, concealed wood-work, and things of like nature. To overcome the obvious objections to tar and enable it to be brought into more general use it is necessary that it should in some way be made capable of penetrating or being absorbed into the material to which it is applied. Various experiments have been made to effect this result without success. Among others, many and ingenious efforts have been made to treat it in connection with tallow, oil, fat, and grease, with a view to its use as a "stuffing" in dressing leather. With these materials in differing proportions it has been subjected to heat under various conditions, and the results have always produced the conviction that they could not be boiled or heated together. Indeed, they have never been so effectually compounded that the tar would be taken up by the pores and carried into the fibers of the skin with the tallow or oil. On the contrary, when applied to the skin an effectual separation of the ingredients took place, and while the tallow or oil was absorbed the tar remained on or near the surface, with all its objectionable qualities. For this reason, notwithstanding its potent and valuable effect upon the qualities of leather, tar, it is believed, has never been practically used as an ingredient in stuffing. For like reasons it has been rejected from most departments of manufacture.

I believe I have discovered a process of so treating tar, in connection with tallow, oil, grease, greasy or fatty matter, or one or more of them, as to cause it to unite therewith and to produce a compound in which the substantial qualities of both the tar and the other ingredients are preserved, and which, as one substance, enters into the pores and takes effect upon the fibers of the skin or other material to which it is applied. I do not think there is any essential chemical change in any of these ingredients, or that either of them lose any of their chemical properties or acquire new chemical powers; but I do think that by my process tar is so treated that it loses its objectionable qualities, becomes capable of being absorbed by porous or fibrous bodies, and, with the other ingredients, forms a new compound, wherein said ingredients assume such a relation to each other that the compound acquires qualities and capabilities not possessed by the ingredients until they have been subjected to my process, and not heretofore imparted to them in conjunction. Particularly is leather improved by being stuffed with this compound. It is rendered more elastic, stronger, more durable, and more impervious to water, and is less affected by changes of temperature.

My process is as follows: Of crude tar I take such quantity as I desire to use—say fifty pounds—and put it in a vessel capable of containing about three times that quantity. I prefer an iron caldron. I then take the desired quantity of tallow—say fifty pounds—and put it in a vessel capable of sustaining a high degree of heat. For this purpose I prefer a cast-iron caldron. I then subject the tallow to intense heat, the higher the better, so that it does not burn—say from 320° to 620° Fahrenheit. Maintaining the tallow at high heat, I introduce it in small quantities into the tar, the latter being all the time stirred. I continue this until the hot tallow has so far penetrated or mingled with the tar as to have warmed the latter to about 100° to 175° Fahrenheit, so that it will flow readily. At this stage I pour upon the tar the remainder of the heated tallow and continue to stir the whole until the temperature is renduced to about 100° Fahrenheit. I then subject the whole to a slow and increasing heat until it boils, and continue the boiling until the thickest part of the scum, which will at first rise to the top, has settled to the bottom, leaving only frothy particles at the top. I then allow it to cool, and it is ready for use.

I prefer to introduce the heated tallow into the tar by means of a faucet set in the tallow-caldron, and capable of delivering a stream of about one-third of an inch in diameter, and for convenience I set the tar-caldron beside and lower than the one containing the tallow, and thus deliver the proper jet of tallow at its full heat into the body of the tar.

It is not essential that the mixture should cool after the tallow has been poured upon the tar and before the boiling in the tar-caldron; but it is better that it should do so, as the impurities are more effectually settled to the bottom by raising the temperature from a low degree to the boiling-point over a slow fire. Nor is it necessary that the stirring should be kept up beyond what is required to effect a complete mixture.

The proportions of tar and tallow above mentioned need not be preserved. Indeed, the proportions of the ingredients are not essential to the working of my process. I use from twenty-five to seventy-five per cent., in pounds, of tar, and the remainder of the one hundred pounds of tallow.

After many trials and much experience, I have found the above to be the best manner of treating tar and working said compound; but I do not intend to limit myself to the exact manner of proceeding described. I qualify the properties of tar by so compounding it with tallow through the instrumentality of high heat gradually applied, and agitation, that it becomes completely absorbable when used as a leather-stuffing, and for other similar purposes, and is not affected by changes of temperature; and these are the leading features of my invention. I heat the tar slowly by the injection of small quantities of heated tallow, as hereinbefore set forth, because I find I can in that way most effectually qualify the tar and produce the most perfect compound with the least expenditure of time and labor; but the same or nearly the same result would follow if small quantities of cold tallow were added to heated tar, the difference being that as the tar will vaporize at about 310° Fahrenheit, so great heat cannot be employed. The tallow when cold cannot well be introduced by injection, and the labor is necessarily much greater. If cold tallow is added to hot tar, save in quantities very small compared to the bulk of the whole, ebullition and spluttering will follow, more or less dangerous, according to the quantity of the mixture and the degree of heat. Heated tar and tallow may, by very gradual heat and the agitation arising from boiling, be made to mingle, but the compound is not so perfect and the process is not so sure, and requires much more time.

I heretofore, on the 22d of January, 1867, took Letters Patent for an "improved composition for the manufucture and preserving of leather," numbered 61,379, which composition consisted of one-quarter of a pound of oil of tar to ten pounds of tallow, one pound of beeswax, one gallon of linseed-oil, and one gallon of neat's-foot oil. My object was to make a preparation, in which tar should be the main or effective ingredient, which could be infused into tanned skins and used in the manufacture of leather, believing that tar would, in its action upon the leather, render it more strong, elastic, and durable. I used the oil of tar because that was the only form in which I could make tar combine with the other materials used and give character to the compound. I subsequently discovered the process set forth in the Letters Patent, a reissue of which I have asked for on this amended specification.

What I claim as my invention, and desire to secure by Letters Patent, is—

1. The so treating tar, in connection with tallow, oil, fat, grease, and fatty or greasy matter, or one or more of said substances, that it becomes completely absorbable and is no longer sensitive to changes of temperature.

2. The process of preparing a compound of tar and tallow, oil, fat, grease, and fatty or greasy matter, or one or more of said substances, by the application of heat with agitation.

3. Causing tar to unite with tallow, oil, fat, grease, and fatty and greasy matter, or one or more of them, producing one substance, by the application of heat with agitation.

4. The purifying of the above-described compound by means of boiling, all substantially as and for the purposes described.

ROBT. ANDREWS.

Witnesses:

EMIL WALLBER,

HENRY SUTTER.